US006266436B1

(12) United States Patent
Bett et al.

(10) Patent No.: US 6,266,436 B1
(45) Date of Patent: Jul. 24, 2001

(54) PROCESS CONTROL USING MULTIPLE DETECTIONS

(75) Inventors: Thomas Arthur Bett, Oshkosh; Tanakon Ungpiyakul, Neenah, both of WI (US); Shawn Timothy Lemery, South Ogden, UT (US); Robert Jeffrey Giza, Appleton; Wayne Allen Bernhardt, Oshkosh, both of WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/289,777

(22) Filed: Apr. 9, 1999

(51) Int. Cl.[7] .............................. G06T 7/00; G01N 21/84; G01N 21/90; G06K 9/78; G06F 19/00

(52) U.S. Cl. ......................... 382/141; 382/111; 700/110; 700/144; 700/302; 702/36; 702/81; 702/123; 702/189

(58) Field of Search ..................................... 382/141, 143, 382/111; 702/81, 36, 94, 82, 83, 84, 85, 123, 189, 182, 199; 700/28, 29, 30, 31, 32, 33, 51, 302, 90, 108, 109, 110, 117, 130, 143, 144

(56) References Cited

U.S. PATENT DOCUMENTS 4,514,846    4/1985   Federico et al. ........................ 371/16

(List continued on next page.)

FOREIGN PATENT DOCUMENTS 0 485 691 A2    5/1992   (EP) ................................ B26D/5/34

(List continued on next page.)

OTHER PUBLICATIONS

*Acquiring and Displaying Images*, COGNEX, pp. 34–35, 136–138, 143, 146–148, 153–154, and 530. Date unknown. but by April 1999.

(List continued on next page.)

*Primary Examiner*—Thomas P. Noland
(74) *Attorney, Agent, or Firm*—Wilhelm Law Service; Thomas D. Wilhelm; Paul Y. Yee

(57) ABSTRACT

Controlling processes comprising detecting and measuring a parameter, for example presence and location of an element of a good, with at least two determinations as representations of the target parameter, transmitting signals to the computer, and processing the signals to compare the parameter to acceptable conditions. The detection can include three or more replications, optionally each for at least two parameters, optionally using at least two different methods to analyze the signals. The invention contemplates detecting and analyzing the target parameters using two or more analytical tools within the respective image to detect a given component of the product, namely two or more measurements of the parameter on a single visual image. Analytical methods can include averaging the signals, determining the number of signals of common signal duration and/or signal characteristics, computing standard deviation, modifying the signal combination to compensate for an inappropriate signal, and/or comparing the signals to a database of signal combinations. The method can automatically compute probable cause of some anomalies in the signals, develop corresponding responses, and transmit responses to process control, and thence to control devices. The methods can automatically recalibrate determinors, or automatically adjust analysis to a basis of one less determinor, and/or automatically implement back-up inspection of goods, optionally saving images for further analysis, or culling units of product. Digitized visual images represent pixels and pixel combinations. The method contemplates analyzing the pixel representations with at least two determinations of the parameter in respective at least two areas of the image, optionally for at least two parameters at respective replication sites, using software interpretation of selected areas of the visual image.

30 Claims, 3 Drawing Sheets

U.S. PATENT DOCUMENTS

| | | | |
|---|---|---|---|
| 4,837,715 | 6/1989 | Ungpiyakul et al. | 356/429 X |
| 5,045,135 | 9/1991 | Meissner et al. | 156/64 |
| 5,068,799 * | 11/1991 | Jarrett, Jr. | 356/430 X |
| 5,113,454 * | 5/1992 | Marcantonio et al. | 382/108 |
| 5,138,377 | 8/1992 | Smith et al. | 355/207 |
| 5,181,081 * | 1/1993 | Suhan | 356/394 |
| 5,195,029 | 3/1993 | Murai et al. | 364/184 |
| 5,200,779 | 4/1993 | Nawata | 355/206 |
| 5,218,406 | 6/1993 | Ebner | 355/205 |
| 5,239,547 | 8/1993 | Tomiyama et al. | 371/16.4 |
| 5,251,273 | 10/1993 | Betts et al. | 382/57 |
| 5,286,543 | 2/1994 | Ungpiyakul et al. | 428/74 |
| 5,309,486 * | 5/1994 | Lichauer et al. | 376/248 |
| 5,315,697 | 5/1994 | Nagamatsu | 395/155 |
| 5,333,062 | 7/1994 | Hara et al. | 358/437 |
| 5,359,525 | 10/1994 | Weyenberg | 364/469 |
| 5,365,310 | 11/1994 | Jenkins et al. | 355/202 |
| 5,388,252 | 2/1995 | Dreste et al. | 395/575 |
| 5,388,618 | 2/1995 | Decock | 139/1 R |
| 5,392,095 | 2/1995 | Siegel | 355/200 |
| 5,437,278 | 8/1995 | Wilk . | |
| 5,452,438 | 9/1995 | Umeda et al. | 395/180 |
| 5,467,355 | 11/1995 | Umeda et al. . | |
| 5,490,089 | 2/1996 | Smith et al. | 364/514 R |
| 5,506,793 * | 4/1996 | Straayer et al. | 702/85 |
| 5,564,005 | 10/1996 | Weber et al. | 395/161 |
| 5,619,445 | 4/1997 | Hyatt | 365/45 |
| 5,659,538 | 8/1997 | Stuebe et al. | 700/124 |
| 5,694,528 | 12/1997 | Hube | 395/113 |
| 5,822,208 * | 10/1998 | Bory | 382/141 X |
| 5,930,139 * | 7/1999 | Chapdelaine et al. | 700/118 |
| 6,038,335 * | 3/2000 | Yokoyoma et al. | 382/141 |

FOREIGN PATENT DOCUMENTS

| | | | |
|---|---|---|---|
| 0 485 691 B1 | 5/1992 | (EP) | B26D/5/34 |
| 2044792 | 5/1992 | (CA) | A61F/13/15 |
| 0 657 852 A2 | 6/1995 | (EP) | G06T/1/20 |
| 7-89063 * | 4/1995 | (JP) . | |
| 7-92103 * | 4/1995 | (JP) . | |
| 9081233 | 3/1997 | (JP) | G05B/23/02 |
| 10-86344 * | 4/1998 | (JP) . | |
| 10-123066 * | 5/1998 | (JP) . | |
| WO 93/07445 | 4/1993 | (WO) | G01B/21/14 |
| WO 97/24283 * | 7/1997 | (WO) . | |

OTHER PUBLICATIONS

"User's Manual Model 1012," *Kodak Ektapro EM Motion Analyzer*, Eastman Kodak Company, 1990. pp. 1.1–7.9. Month not given.

* cited by examiner

PROCESS CONTROL USING MULTIPLE DETECTIONS

CROSS-REFERENCE TO RELATED APPLICATIONS

This application claims priority to Provisional Application Ser. No. 60/114,418 filed Dec. 31, 1998.

BACKGROUND

This invention relates to apparatus and methods for automatically monitoring and evaluating manufacturing processes, and goods made by manufacturing processes. The invention relates to, for example, operations which produce an ongoing stream of outputs such as discrete absorbent articles, for example disposable diapers, effective to absorb body fluids. Such absorbent article products are typically fabricated as a sequence of work pieces being processed on a continuous web, typically operating on a processing line. Such absorbent article product generally comprises an absorbent core confined between a moisture impervious baffle of e.g. polyethylene and a moisture pervious body side liner of e.g. non-woven fibrous material. The absorbent articles are typically made by advancing one of the webs along a longitudinally extending path, applying the absorbent core to a first one of the webs, and then applying the second web over the combination of the first web and the absorbent core. Other elements such as elastics, leg cuffs, containment flaps, waste bands, and the like are added as desired for the particular product being manufactured, either before, during, or after, applying the second web. Such elements may be oriented longitudinally along the path, or transverse to the path, or may be orientation neutral.

Typical such manufacturing processes are designed to operate at steady state at a pre-determined set of operating conditions. While such process is operating at steady state conditions, the result desired from the process is desirably and typically achieved. For example, where the process is designed to produce a certain manufactured good, acceptable manufactured goods are normally produced when the process is operating at specified steady state conditions. As used herein, "steady state" conditions represents more than a single specific set of process conditions. Rather, "steady state" represents a range of specified process conditions which correspond with a high probability that acceptable goods will be produced, namely that the products produced will correspond with specified product parameters.

While a conventional such process is operating, sensors and other monitoring apparatus are typically used individually at various locations along the processing line to automatically sense various respective parameters with respect to, and to otherwise monitor the condition of, the good being manufactured. For example, in a diaper manufacturing operation, a sensor such as a photoelectric eye may be used to sense the presence or absence of a particular element of the diaper such as an ear, the edges of a waist band, the edge or edges of the absorbent core, or the like. In addition, a vision imaging system may be used as another form of sensor to detect and/or measure important dimensions or components on, the units of goods being manufactured.

Known analytical models and control models are based on assumptions that errors related to such sensings, collectings, and recordings are negligible, and thus that all determination signals, or absence of such determination signals, including quantitative signals, as well as the visual images and image analysis measurements made therefrom, are in fact accurate representations of the elements purportedly being detected and/or measured.

However, actual operation of many manufacturing processes, including highly automated processes, typically includes the occurrence of periodic, and in some cases numerous, errors, inaccuracies, or omissions in the determination signals and/or the visual images. Such errors, inaccuracies, or omissions may be caused by any of a variety of factors. Such factors may be, for example and without limitation, complete catastrophic failure of the sensor, intermittent failure of the sensor, error in sensor calibration, a transient out-of-calibration condition of the sensor, an effective obstruction between the sensor and the element to be sensed, or a loose or broken connection between the sensor and the computer or other controller to which the sensor is connected. Such factors also generally apply to vision imaging systems, including the lighting or camera, as well as numerous product component and process irregularities.

A variety of possible events in the manufacturing operation can cause the production of units of product which fall outside the specification range. For example, referring to manufacture of absorbent articles, stretchable materials can be stretched less than, or more than, the desired amount. Elements can become misaligned relative to correct registration in the manufacturing operation, or improperly folded over, or creased, or crimped, or torn. Timing between process steps, or speed of advance of an element, can stray from the target ranges. If non-catastrophic changes in process conditions can be detected quickly enough, typically process corrections can be made, and the variances from target conditions can accordingly be controlled such that the product remains within accepted specification ranges, without having to shut down the manufacturing operation, and preferably without having to cull, and thereby waste, product.

A variety of automatic product inspection systems are available for carrying out routine ongoing automatic inspection of product being produced on a manufacturing line, and for periodically and automatically taking samples for back-up manual evaluation. Indeed, periodic manual inspection and evaluation of product samples is still important as a final assurance that quality product is being produced. However, in high-speed manufacturing processes, the primary tool for ongoing product inspection is one or more computer controlled automatic inspection systems which automatically, namely without necessary direct human intervention, inspect the product being manufactured, preferably inspecting every unit of such product.

Where product is outside the accepted specification range, and should be culled, it is desired to cull all defective product, but only that product which is in fact defective. If too little product is culled, or if the wrong product is culled, then defective product is inappropriately released for shipment. On the other hand, if product which in fact meets accepted product specification is culled, then acceptable and highly valuable product is being wasted.

Body-fluid-absorbing absorbent articles such as are of interest herein for implementing the invention are typically manufactured at speeds of about 50 to about 1200 articles per minute on a given manufacturing line. Accordingly, and especially at the higher speeds, it is impossible for an operator to manually inspect each and every absorbent article so produced. If the operator reacts conservatively, culling product every time he/she has a suspicion, but no solid evidence, that some product may not meet specification, then a significant amount of in-fact-good product will have been culled. By contrast, if the operator takes action only when a defect has been confirmed using visual or other manual inspection, defective product may have already been released into the stream of commerce before the defective condition has been confirmed.

One way for the operator to inspect the product for conformity with the specification range is for the operator to periodically gather, at random, samples of the product being produced, and to inspect such random samples off-line. Random such inspections stand little prospect of detecting temporary out-of-specification conditions. On the other hand, where samples are taken by an operator in response to a suspected out-of-specification condition, given the high rate of speed at which such articles are manufactured, by the time the operator completes the inspection, the suspected offensive condition may have existed long enough that a substantial quantity of questionable or defective product will have either been shipped or culled without the operator having any solid basis on which to make the ship/cull decision. Further, automated manufacturing process controls may have self-corrected the defect condition before the operator can take samples, or before the operator can complete the visual/physical inspection and act on the results of such visual inspection. Thus, conventional manual inspection by an operator, while providing the highest potential level of inspection quality holds little prospect of effectively monitoring and controlling temporary out-of-specification conditions, or of pro-actively controlling processing conditions which could produce out-of-specification product, in processes fabricating product at the above-specified rates.

While off-line inspection can be a primary determinant of quality, and typically defines the final quality and disposition of groups of the product, on-line inspection, and off-line evaluation of on-line-collected data, typically associated with certain manufacturing events, may provide valuable insight into both the operational characteristics of the manufacturing process and the final quality parameters of the product, as well as insight into potential proactive improvements which might be made in process control.

Thus, in processes that operate at speeds such that manual inspection of each unit of product is an unrealistic expectation, the primary mechanism for inspecting each unit of product is one or more computer controlled automatic inspection and control systems, optionally including a vision imaging system, backed up by periodic manual inspections of physical samples, or sample images, of product to confirm the accuracy of the decisions being made by the automatic inspection and control systems. Such automatic inspection and control systems automatically, namely without necessary direct human intervention, inspect the product being manufactured, preferably inspecting every unit of such product.

Automatic inspection and control systems rely on a plurality of sensing devices and analytical tools to detect a corresponding plurality of different pre-selected parameters, qualitatively and typically quantitatively, in the goods being produced. Such pre-selected parameters are selected for their prospects of representing the actual overall degree to which the goods conform to pre-selected specifications. The conclusions reached, and the control actions taken on the basis of such conclusions, are only as reliable as the determination signals created and/or developed by the respective sensing devices and analytical tools. The reliability of such determination signals is thus critical to the ability of the automatic inspection and control system to sufficiently and efficiently control the manufacturing operation.

While sensors and analytical tools are readily available for use in automatic inspection and control systems, typical such sensors and analytical tools must be carefully manipulated, such as positioned, mounted, calibrated, programmed, and the like, and so maintained in a manufacturing environment.

As a practical matter, such sensors and tools will periodically develop and/or transmit erroneous determination signals, even when managed by a regular maintenance program. In typical situations, the inspection and control system is unable to detect the fact that such signals are erroneous signals, whereby the inspection and control system fails by responding, erroneously, as though the signals were in fact accurate or fails by not responding at all. While the overall purpose of automatic inspection and control is to minimize shipment of defective product, such erroneous response can in fact result in the control system being the cause of product being out-of-specification. Namely, an error in the control system can actually result in release and shipment of product which does not meet accepted specification ranges. So it is critical that the incidence of errors, particularly erroneous determination signals, be limited as much as possible.

As indicated above, there are both advantages and limitations to automatic inspection and control systems. A significant advantage of such systems is that the speed of automatic analysis enables such systems to inspect each and every unit being fabricated on manufacturing lines operating at the suggested speeds. Such automatic inspection and control systems are required where rate of product manufacture exceeds the rate of reasonable human/manual inspection, even allowing for multiple humans to do inspections.

A limitation of automatic inspection and control systems is that, while such systems conventionally may have the ability to distinguish an accurate determination signal from an erroneous determination signal, they cannot compare, correct, or compensate for erroneous signals. Further, conventional such systems inspect only a limited portion of the product. And while erroneous signals and readings do not happen often enough to suggest that such automatic inspection and control systems have no net value, to the extent the incidence of erroneous signals can be reduced, or to the extent the incidence of accepting erroneous signals as accurate representations of the overall condition of the product can be reduced, the value of such automatic inspection and control systems will be enhanced.

It is an object of this invention to provide improved inspection and control systems, and methods of measuring parameters of the product so as to increase reliability of the decisions made from processing of the determination signals created and/or developed by such inspection and control systems.

It is another object to provide inspection and control systems, and methods of use, which effectively analyze the determination signals and automatically correct for certain defective signals and signal conditions.

It is yet another object to provide inspection and control systems, and methods of use, which effectively modify the determination signal input when the control system detects a defect in the signal.

It is still another object to provide inspection and control systems, and methods of use, which detect out-of-calibration sensors and/or analytical tools, and automatically recalibrate such sensors and/or tools.

It is a further object to provide inspection and control systems which automatically implement back-up inspection of goods associated with defective determination signals.

It is an overall object to provide inspection and control systems which reduce the incidence of erroneous signals being provided to the controller of the manufacturing operation.

It is a more specific object to provide inspection and control systems which reduce the incidence of erroneous signals being accepted as accurate by the controller of the manufacturing operation.

SUMMARY

This invention contemplates a method of measuring a parameter of goods being fabricated in a manufacturing operation. The method comprises establishing a target parameter to be measured on the goods, and acceptable conditions of the target parameter. The method develops a measurement strategy for measuring the target parameter; and detects and measures the target parameter with respective at least first and second separate and distinct replications of determinations of the condition of a segment of the goods using at least one of multiple independent determinors or a common determiner taking multiple determinations at corresponding sites on the good. Each of the sites desirably indicate a common acceptable condition of the target parameter. The method thus develops respective at least first and second separate and distinct replicate determination signals as representations of the target parameter. Subsequent to developing the measurement strategy, the method contemplates programming a programmable device to use an appropriate analysis method to evaluate the determination signals, transmitting the determination signals to the programmable device for analysis, and processing the determination signals in the programmable device so as to use the respective analysis method to analyze the determination signals so received, for conformity to the established acceptable conditions.

Some embodiments include detecting the target parameter with respective at least first and second separate and distinct replications of determinations for at least first and second parameters at respective replication sites on the goods.

Some embodiments include processing the determination signals so as to use first and second different analytical methods to analyze the determination signals representative of the respective first and second parameters.

Some embodiments include detecting the target parameter with respective at least first, second, and third separate and distinct replications of determinations of the condition of the goods, optionally each for at least first and second parameters at respective replication sites on the goods, optionally including processing the determination signals from the respective first and second parameters so as to use respective first and second different analytical methods to analyze the determination signals representative of the respective first and second parameters.

The methods can include detecting the target parameter using first and second separate and distinct sensors, optionally selected from the group consisting of electric eye sensors, infrared sensors, motion sensors, temperature sensors, vision cameras, and ultraviolet and other visible spectrum light sensors.

A variety of analytical methods can be used to process the determination signals, for example computing an average of e.g. the three or more signals, determining the number of signals of common or nearly common magnitude or other characteristics, or computing a standard deviation based on the determination signals. When the processing and/or analysis. optionally including human analysis, of the determination signals comprises concluding that a given one of the determination signals is conveying an erroneous message, the method can include, automatically and according to programmed instructions, modifying the signal combination to compensate for the erroneous signal.

The processing of the signals can include comparing the signals either alone or in combination to a database of known and/or expected signal combinations. Such database optionally includes a historical probability of the occurrence of respective ones of the combinations. Based on the comparison of the determination signals to the database of signal combinations, the method develops a conclusion as to the probable cause of any anomaly in the signal combination, and develops a corresponding response to the signal combination. Such anomaly can, for example and without limitation, represent anomalies in the product being fabricated, anomalies in detection of the parameter of interest, anomalies in sensor receipt and/or processing of the parameter detection, anomalies in sensor set-up, anomalies in sensor calibration, and the like.

The methods can include transmitting the computed response as a control signal to a process controller controlling the manufacturing operation, and thence to process control devices which physically make adjustments to the operation of the manufacturing process.

The methods can include, when the analysis detects an out-of-calibration condition in one of multiple independent determinors, automatically recalibrating the out-of-calibration determiner, in time, or intensity, or both.

The methods can include, when the analysis detects inappropriate input from one of multiple independent determiners, automatically adjusting the analysis to a basis of one less determiner, and/or automatically implementing back-up inspection of goods associated with the inappropriate of input.

The invention generally comprehends a manufacturing operation wherein a manufacturing line has a plurality of work stations, namely locations where a process or inspection is performed on a work piece, and wherein the first and second replications can be taken at a common such work station, or wherein a second replication is taken at a work station spaced from, for example downstream of, the work station at which the first replication is taken. Typically, the method comprises so analyzing each and every one of the units of the goods on the manufacturing line.

In a more specific family of embodiments, the invention comprehends a method of measuring a parameter of goods being fabricated in a manufacturing operation. The method comprises establishing a target parameter to be measured on respective units of the goods, and acceptable conditions of the target parameter, and capturing a full digitized visual image of a unit of the goods being fabricated. The digitized visual image represents pixels and pixel combinations in the visual image. The method analyzes the digital pixel combination representations in at least first and second areas of the captured full digitized visual image, which respective areas of the image are specified to indicate, collectively and in combination, a common acceptable condition of the target parameter. The method thereby generates respective first and second replicate determination signals representative of the target parameter, and analyzes the determination signals in combination, for conformity to the established acceptable conditions, utilizing one or more respective appropriate analysis method for each such analysis.

In some embodiments, the method includes analyzing pixel combination representations in at least first and second areas of the image and thereby generating respective first and second combination determination signals, for at least first and second parameters.

In some embodiments, the method includes processing the determination signals so as to use first and second different analytical methods to analyze the determination signals representative of the respective first and second parameters.

In some embodiments, the method includes analyzing the pixel combination representations with respective at least first, second, and third separate and distinct replications of determinations of the condition of the target parameter in respective at least first, second, and third areas of the image, optionally for at least first and second parameters at respective replication sites on the goods.

The method can include processing the determination signals from the respective first and second parameters, so as to use first and second different analytical methods to analyze the determination signals representative of the respective first and second parameters.

The processing of the determination signals can comprise e.g. computing an average of the e.g. three signals, determining the number of signals of common or nearly common magnitude, and/or computing standard deviation based on the determination signals.

Processing of the determination signals can comprise concluding that a given one of the determination signals is erroneous or otherwise inappropriate, has shifted in time or intensity or has otherwise changed, from the corresponding signals received from previous units, and modifying, correcting, or compensating for the signal combination to thereby better utilize the data so collected.

Processing of the determination signals can comprise comparing the signal combination to a database of known and/or expected signal combinations, optionally including a historical probability of the occurrence of respective ones of the combinations, and based on the comparison, developing a conclusion as to the probable cause of any anomaly in the signal combination, and developing a corresponding response to the signal combination.

The method can include transmitting the response as a control signal to a process controller controlling the manufacturing operation.

The multiple analyses of the pixel combination representations can comprise respective multiple determinations using software interpretation of selected areas of the full digitized visual image.

The method can include, when the analysis detects indeterminate or otherwise inappropriate input from one of the selected areas of the image, automatically adjusting the analysis to a basis using one less area in the analysis.

The method preferably comprises so analyzing sequential ones of the absorbent articles produced on the manufacturing line, preferably all articles produced on the manufacturing line.

In still another family of embodiments, the invention comprehends a method of measuring the location of an element on an absorbent article being fabricated in a manufacturing operation. The method comprises establishing an acceptable location for the element on the absorbent article, and capturing a full digitized visual image of the absorbent article. The full digitized visual image represents pixels and pixel combinations in the visual image. The method analyzes the digital pixel combination representations in at least first and second areas of the captured full digitized visual image, which respective areas of the image desirably indicate, collectively and in combination, a common acceptable location of the element. The method thereby generates respective first and second replicate determination signals representative of the location of the element, and analyzes the determination signals in combination, for conformity of the location of the element to the established acceptable locations, utilizing one or more respective appropriate analysis methods for each such analysis.

The method can include analyzing pixel combination representations in at least first and second areas of the image and thereby generating respective first and second combination determination signals, for at least the above-recited element location, and for a second parameter.

In some embodiments, the method includes processing the determination signals so as to use first and second different analytical methods to analyze the determination signals representative of the respective location, and the second parameter.

The method preferably includes analyzing the pixel combination representations with respective at least first, second, and third separate and distinct replications of determinations of the location of the element in respective at least first, second, and third areas of the image, and optionally of a second parameter at respective replication sites on the goods.

The method can include processing the determination signals from the respective location, and the second parameter, so as to use first and second different analytical methods to analyze the determination signals representative of the respective location, and the second parameter.

The analytical methods can comprise, for example and without limitation, computing an average of the three signals, determining the number of signals of common or nearly common magnitude, and/or computing a standard deviation based on the determination signals.

When processing of the determination signals comprises concluding that a given one of the determination signals is inappropriate, the method can further include modifying the signal combination to thereby compensate for the inappropriate signal.

The method can include comparing the signal combination to a database of known and/or expected signal combinations, optionally including a historical probability of the occurrence of respective ones of the combinations in such absorbent articles, and based on the comparison, developing a conclusion as to the probable cause of any anomaly in the signal combination, and developing a corresponding response to the signal combination.

The method can include transmitting the response as a control signal to a process controller controlling the manufacturing operation.

The method can include, when the analysis detects inappropriate input from one of the above areas of the image, automatically adjusting the analysis to a basis of analyzing one less area.

The above recited multiple analyses of the pixel combination representations generally comprise respective multiple determinations made using software interpretation of selected areas of the full digitized visual image.

The invention still further comprehends a method of determining a characteristic of a parameter of goods being fabricated in a manufacturing operation. The method comprises operating a vision imaging system collecting visual images in the manufacturing operation and thereby collecting discrete real-time visual images at a rate of at least 50 images per minute; sending data representing full digitized visual images of such real-time visual images so collected, to a memory storage device; retrieving one or more of such stored full digitized visual images from the memory storage device; and detecting a target parameter on the retrieved full digitized visual image, with respective at least first and second separate and distinct replications of determinations of a condition of a segment of the goods.

The invention comprehends that the sending of data to the memory storage device, and retrieval from the memory storage device, comprise sending the data to, and retrieving the data from, a permanent memory storage device which retains data in memory when power is removed from the memory storage device.

In some embodiments, the method comprehends retrieving historical images off-line, which images represent units of product no longer being routinely, actively worked on by the manufacturing operation. The method thus comprises analyzing one or more historical sets of images using one or more analytical methods, and thereby detecting a change trend in the manufacturing operation.

The method can include maintaining substantially full digital integrity of the visual images so stored, compared with the images as collected, thereby to enable substantially full visual reproduction of the visual images so stored.

In some embodiments, as with on-line analysis, the method of off-line image analysis includes detecting the target parameter, on respective images, with respective at least first and second separate and distinct replications of determinations for at least first and second parameters at respective replication sites on the images.

The method can include the detecting of the target parameter with respective at least first and second separate and distinct replications of determinations of the condition of a segment of the goods comprising using at least one of (i) multiple independent determiners, or (ii) a common determiner taking multiple determinations at corresponding sites on the image, or on multiple related such retrieved images, which sites desirably indicate, in combination, a common acceptable condition of the target parameter.

Figure 1:
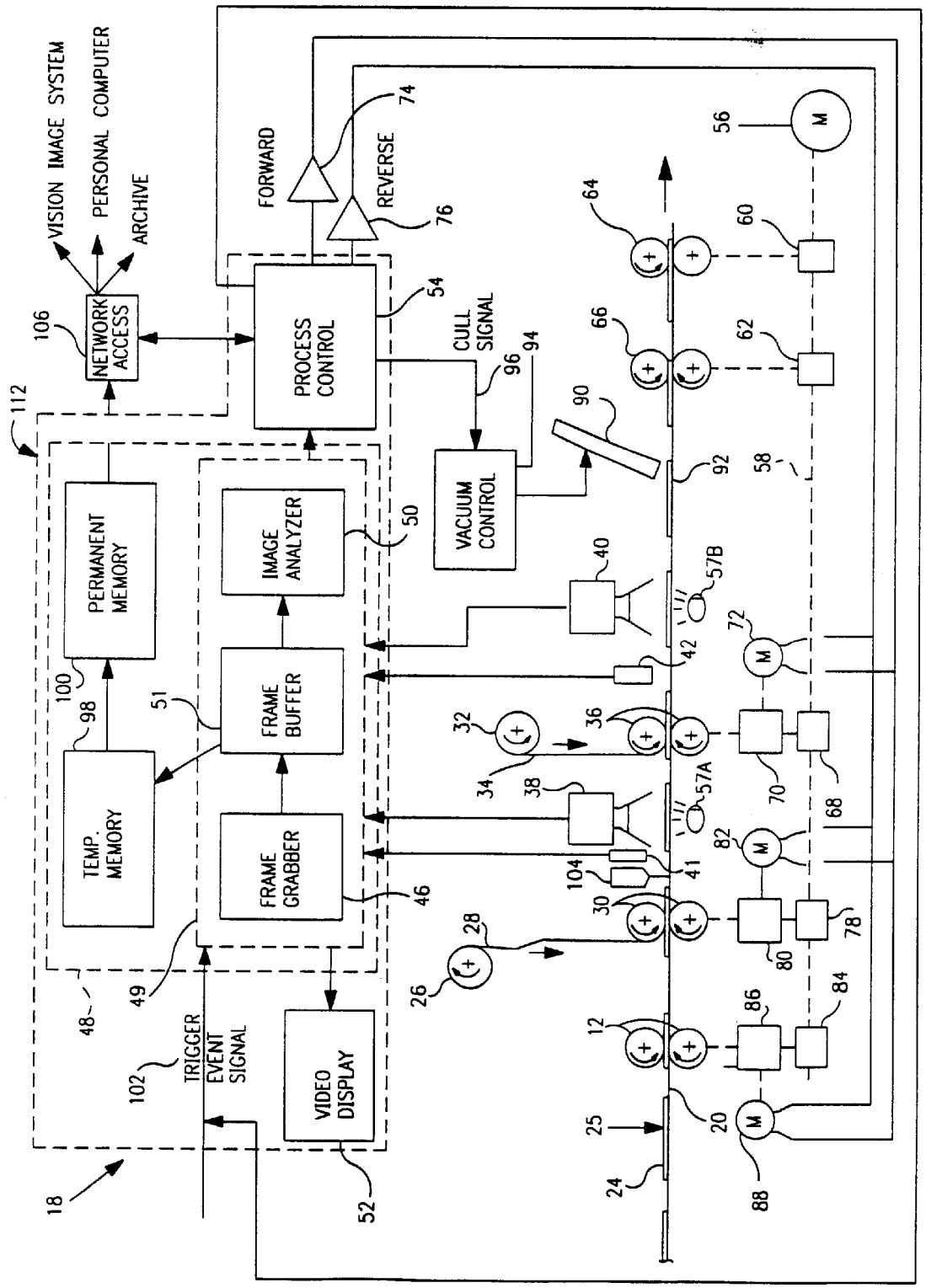
FIG. 1 is a side elevation view of absorbent article manufacturing apparatus of the invention, having an automatic inspection and control system including a vision imaging subsystem comprising image collection, display, and storage apparatus and controls, as well as interface of the vision imaging system with the manufacturing process control system and a memory storage system.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Figure 2:
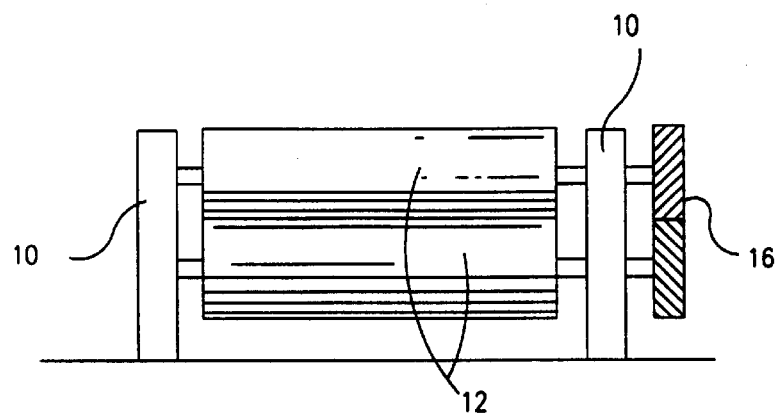
FIG. 2 is a representative end elevation view, also substantially schematic, of a portion of a line of manufacturing machines of FIG. 1, used to make absorbent articles.

With reference to the drawings, and more particularly to FIG. 2, the numeral designates a pair of side frame elements which define a longitudinally extending processing path for the processing of absorbent articles according to the invention. Rotatably mounted on side frames 10 are a pair of processing draw rolls 12 driven by gears 16. Processing draw rolls 12 can be seen toward the left portion of FIG. 1.

Now referring to FIG. 1, absorbent article producing apparatus of the invention is illustrated schematically at 18. Beginning at the left end of FIG. 1, an underlying web 20, for example a moisture impervious baffle web, is shown being advanced toward the right along the longitudinally extending path, by draw rolls 12. Omitted for clarity of presentation is the upper confining web such as a body side liner web.

Absorbent pads 24 are shown disposed on web 20 at spaced intervals generally corresponding to the respective separate and distinct work pieces or products being fabricated into absorbent articles along the processing path. Additional elements such as leg cuffs, containment flaps, waist bands, and the like are placed, positioned, and otherwise consolidated onto or into continuous web 20, or onto or into each other, at various work stations along the processing path, in the process of fabricating the absorbent articles.

For example, unwind 26 supplies leg cuff material 28 which is placed on web 20 at rolls 30. Similarly, unwind 32 supplies waist band material 34 which is placed on web 20 at rolls 36.

Camera 38 is positioned between the work station defined by rolls 30 and the work station defined by rolls 36. Optional camera 40 is positioned downstream of rolls 36. Once turned on, and so long as they remain turned on, cameras 38, 40 continually collect images and transmit such images to vision system 49. Image trigger device 41 is between rolls 30 and camera 38. Image trigger device 42 is between rolls 36 and camera 40. Cameras 38, 40 communicate with vision system 49 of imaging system 48.

Imaging system 48 includes vision system 49, temporary memory 98, and permanent memory 100. Vision system 49 includes frame grabber 46, frame buffer 51, and image analyzer 50. Image trigger devices 41 and 42 are activated by sensing, for example, the passing of a specific element on each work piece, for example an outwardly-extending ear 44, illustrated in FIG. 3. This activation provides a signal to vision system 49, which sends detect signals to frame grabber 46 and respective strobe light 57A or 57B, also for each work piece. The detect signal thus synchronizes firing of the respective strobe light and corresponding grabbing of the respective frame or image of each respective work piece, then being collected by and transmitted from the respective camera, by frame grabber 46.

Each frame so grabbed is transmitted by frame grabber 46 to frame buffer 51 in registration with movement of the respective work pieces on the manufacturing line such that the frame grabber transfers a visual image of each work piece in accord with detect signals created by the passing of respective work pieces past image trigger devices 41 and 42. While image trigger devices 41 and 42 are illustrated between the rolls and the respective cameras, the trigger devices could be at any location on the processing line which location is compatible with timely collection of frames being recorded by the respective camera or cameras.

Thus, a visual image of each work piece is grabbed and analyzed by vision system 49. Such visual images are sent from frame grabber 46 to frame buffer 51, thence to image analyzer 50 where data analysis is conducted and, upon request by trigger event signal 102, to temporary memory 98. After being processed by vision system 49, the processed camera signal is sent to video image display device 52. The frame grabber, the frame buffer, the image analyzer, the temporary memory, and the permanent memory are all elements of imaging system 48 in the illustrated embodiment.

Figure 3:
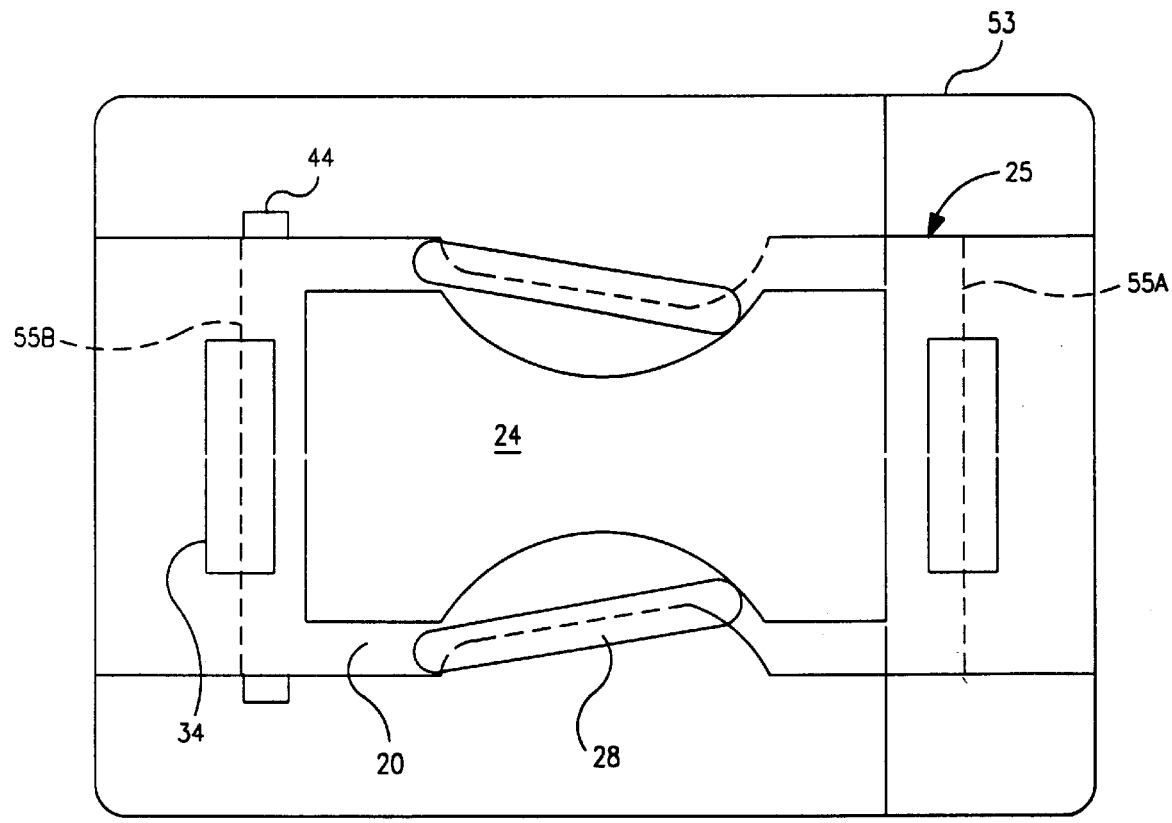
FIG. 3 is a plan view illustrating a typical image as displayed to the operator and stored in memory, and showing an enlarged top view of a portion of the absorbent article manufacturing operation.

Referring to FIG. 3, the closed outline 53 represents the camera field of view and it will be seen that outline 53 embraces somewhat more than the length of a single work piece 25, but less than the length of two work pieces, disposed generally in the center of outline 53, between projected transverse lines of severance 55A, 55B, which define the boundaries between sequential work pieces.

Referring now to FIG. 1, a suitable imaging system for use in the invention, including camera, video image display device, frame grabber, and image analyzer, is available from Cognex Corporation, Natick, Mass., USA, as CHECK-POINT 800.

Suitable software for collecting, displaying, and analyzing the visual images so collected, of individual ones of the absorbent articles being fabricated in the manufacturing operation, is also available from Cognex Corporation.

The visual image signals collected by camera 38 and optional camera 40 are processed by frame grabber 46 and image analyzer 50. Frame grabber 46 converts the images received from the camera or cameras into digitized representations of the visual images so recorded. Image analyzer 50 analyzes the digitized representations, making a series of measurements according to earlier-programmed software instructions. The results of such analyses are fed to process control 54. Process control 54 receives such results signals and issues output commands, as appropriate, to adjust and modify the manufacturing process in order to rectify any anomalous readings and, as appropriate, to steer the manufacturing operation toward pre-selected target specifications stored in the process control memory.

Thus, signals may be sent to speed up, or slow down, the absolute speed of the manufacturing line, or to advance or retard the timing, of one or more of the process steps at respective work stations in the processing line. Further, signals may be sent to cull product from the manufacturing line and/or to shut the line down.

Referring again to FIG. 1, the number 56 designates the main drive motor which powers the machinery operating the absorbent article production line, which main drive motor is employed to turn a line shaft 58 coupled by gear boxes 60, 62, to draw rolls or turning rolls 64, 66 respectively.

Line shaft 58 is also coupled by gear box 68 to differential 70 which is operated by motor 72 in response to signals from process control 54 through a forward signaling device 74 or a reverse signaling device 76, both of which are coupled to motor 72, to advance or retard the speed of draw of rolls 36, and thereby to advance or retard the speed of flow of work pieces through rolls 36, and accordingly, the relative positioning at which waist band material 34 is applied to the work pieces.

Similarly, line shaft 58 is coupled by gear box 78 to differential 80 which is operated by motor 82 in response to signals from process control 54 through signaling devices 74, 76, both of which are also coupled to motor 82, to advance or retard the relative positioning of work pieces through rolls 30, and accordingly, the relative positioning at which leg cuff material 28 is applied to the work pieces.

Further, line shaft 58 is coupled by gear box 84 to differential 86 which is operated by motor 88 in response to signals from process control 54 through signaling devices 74, 76, both of which are also coupled to motor 88, to advance or retard the speed of draw of work pieces 25 into rolls 12, and accordingly, the speed at which web and the elements resident thereon are fed toward the respective downstream work stations. After an image has been analyzed by analyzer 50 and has been processed by process control 54, correction logic embodying the range of specifications acceptable for the work piece can be delivered to signaling devices 74 (forward) and/or 76 (reverse), or to vacuum control 94 for culling work pieces.

Additional work stations, not shown, can be employed in similar manner to place and/or affix others of the elements of the absorbent articles, directly or indirectly, onto web 20.

Vacuum shoe 90 is positioned over work station 92 downstream of camera 40, and is controlled by vacuum control 94. In circumstances wherein the signals received by process control 54 indicate that the work piece which was imaged and analyzed is outside accepted specification range, process control 54 sends a cull signal 96 to vacuum control 94, activating vacuum to vacuum shoe 90 at the appropriate time to cull the individual work piece which gave the out-of-specification information. Where desired, and where suitable lead time is available to the cull system, vacuum control 94 can be programmed to cull, in addition, a specified number of work pieces before and/or after the work piece which yielded the out-of-specification visual image information.

In addition to providing an output to process control 54, vision system 49, on demand, also outputs visual image information to high speed temporary memory 98 which subsequently outputs the visual image information to permanent memory 100. The visual image information inputted from vision system 49 to temporary memory 98, and subsequently to permanent memory 100, is sufficient in quantity and satisfactory in quality and specificity, to generally re-create the individual images collected by camera 38 and/or camera 40. Thus, the stored information maintains substantially the full integrity, typically full digital integrity, of the visual images so stored, so as to be fully representative of the images recorded or collected by camera 38 or 40. Accordingly, the visual images so stored enable the user to substantially reproduce the respective images which were available to the operator in real-time during manufacturing of the respective absorbent articles.

A temporary memory suitable for general purpose use in association with the invention is a VME memory card having memory capacity of up to about 1 Gigabyte, and is available from Chrislin Industries Inc., Westlake Village, Calif., USA. Such temporary memory can capture, and store in memory, visual images of typical absorbent articles such as those described herein, at the high capture/store rate of at least about 500 images per minute, up to about 1000 images per minute, potentially up to about 1200 images per minute.

Communication between vision system 49 and temporary memory device 98 requires use of a suitable protocol such as a VME standard to transfer data across the computer backplane or other link to a temporary memory device. Such a temporary memory is a VME bus standard IEEE 1014.

While the high image capture rate of temporary memory 98 is important to long-term capture and storage of full digitized visual images, such high capture rate memory storage devices have certain limitations. First, such devices are costly in terms of the cost per image so captured and stored. Further, high capture rate devices such as the buffer memory devices described above are temporary memory storage devices within the context that such storage devices retain captured information in memory only so long as the respective memory device is powered, and lose all information stored in memory when power is removed from such memory devices.

Accordingly, for permanent storage to be effected, it is critical that the visual image information received in the high-speed temporary memory storage, e.g. buffer, device be expeditiously transferred to a permanent memory storage device. A typical suitable permanent memory storage device is, for example, a hard drive such as hard drives commonly used in personal computers. Where a larger amount of memory is desired than is available on a conventionally-available hard drive, a combination of such hard drives can be coupled together in well known manner to thereby provide the composite capacity of all the hard drives so coupled together.

The value of temporary memory device 98 is to enable high-speed real-time transfer of the visual image information from the imaging system. Conventional permanent memory devices are too slow for such real-time transfer at any reasonable interface cost, whereby the temporary memory device is used.

The value of permanent memory 100 is three-fold. First, once the information has been received into permanent memory, such permanent memory can be accessed by a variety of users, if desired, through a typical networked computer interface system. Second, permanent memory retains the information in memory when power is turned off and wherein power is disconnected from the permanent memory storage device, and power is then lost. Thus, once the visual image information is disposed in permanent memory, the risk of loss from removal or interruption of power supply is obviated. Third, permanent memory is less costly than temporary e.g. buffer memory.

Accordingly, images which conventionally have been available only to the operator on the manufacturing line, and which have been available only as real-time images, are now available at any time, to anyone having access to the permanent memory device, such as from a remote computer terminal through, and remote from, network access 106. Similarly, the data from automatic analyses done by image analyzer 50 and stored in process control 54 can be polled and accessed from a remote terminal such as a personal computer, through network access 106, thus allowing direct correlation and comparison of specific images with specific process control information. The images accordingly remain available for real-time use at the manufacturing line, as before; and can, in addition, be accessed either on or off the manufacturing floor at a later time by any authorized user, for further analysis at whatever level of analysis is desired.

Thus, visual images of the product, or the process, can be permanently archived, and associated with specific manufacturing periods or specific manufacturing events, without interrupting ongoing collection of such visual images. In addition, the visual images so stored in memory can be re-created from the stored data in the same or another vision system, or can be stored and re-used in other software applications such as in combination with bit-map systems. However stored, and however retrieved, such retrieved information can be used for in-depth analysis of the results, on the work pieces, of specific events occurring on the manufacturing line as well as analysis of the products produced on the manufacturing line.

Individual images recorded or received at cameras 38, 40, and ultimately stored in permanent memory 100, can be accessed individually from permanent memory 100, and analyzed as desired, any time after the respective images are stored in permanent memory. For example, an analyst can choose to review and analyze a certain set of images based on the occurrence of a triggering event, or a set of images recorded, according to the time at which the images were collected.

As is well known for use of such computer memory devices, visual image data which is permanently stored in e.g. permanent storage device 100 can be written over or erased at will in order to make such storage space available for use to store other information, for example later-produced data.

The above described imaging system 48 has a rate capacity capable of producing a visual image of each and every work piece produced by the manufacturing operation at speeds up to 1200 images per minute. Indeed, it is desirable to the line operator that the imaging system does produce a visual image of each and every work piece, and does permanently record certain data pertaining to each and every work piece. However, such routine measurement data recorded by the imaging system conventionally comprises only results-type information related to the visual image, for example certain distance measurements, and bears no capability to recreate the actual image.

It is not practical to store a full visual image, pixel by pixel, of each and every work piece. Such storage of all visual images so produced would require an inordinate amount of memory storage capacity. In addition, since the rate of production of such images is greater than the input rate capacity of a typical hard drive permanent memory storage device to receive such information, such storage would have to be carried out in parallel with multiple permanent memory devices concurrently receiving memory storage inputs. Still further, the amount of data so stored in memory would make it difficult for an inquirer to identify images of particular interest for further study and/or to correlate any such images with specific events in the manufacturing process. Thus, efficient searching, sorting, and retrieval of visual image information suggests at least an initial sorting of such images prior to storage so as to store only those images having a relatively higher probability of containing information which will be valuable during subsequent data analysis.

Accordingly, it is important that full digitized visual images be transferred from frame buffer 51 to a memory storage device such as temporary buffer memory 98 only upon the occurrence of selected, preferably predetermined, triggering events. By limiting transfers to memory to only those images associated with certain triggering events or other higher risk events, the amount of storage media required is appropriately limited to a manageable amount, and the amount of data stored, and which may be reviewed to find evidence of an event of interest, is also limited so as to be manageable.

The suggested Cognex Imaging system can be programmed to transfer to memory a specified number of visual images upon the occurrence of a specified triggering event. The transfer can begin so as to take samples wherein the work piece being imaged when the triggering occurred is at or toward the beginning of the sample, in the midst of the sample, or at or toward the end of the sample.

The user can specify, as a triggering event for collection of visual image data, any event of interest which can be identified to process control and captured by the camera. For example, a splice in any of feed webs 20, 28, 34 might be specified as a triggering event. A certain amount of change in line speed might be specified as a triggering event. A certain amount of change in tension of one or more webs might be specified as a triggering event. An out of specification condition might be specified as a triggering event. Additionally, a manual trigger can be used to initiate image capture, as can a timer, or a random number generator.

However the triggering event is created or triggered, manufacturing controls are configured such that, upon the occurrence of a triggering event, a signal 102 is generated, e.g. by a sensor or by a process control command, and transmitted to vision system 49, triggering frame buffer 51 to begin sending visual images to memory, and specifying how many images are to be sent to memory.

Thus, upon the occurrence of a triggering event to identify the first image of a group of images to be retained, a defined set of a limited number of real-time visual images so collected is sent from frame buffer 51 to temporary memory device 98. Preferably while information is still being received by temporary memory device 98, memory device 98 begins transferring the visual image information to permanent memory device 100 at the slower rate at which the permanent memory device is capable of receiving and storing such information.

Accordingly, in preferred embodiments, part of the visual image information has already been transferred to permanent storage device 100 by the time the last of the set of images has been received in high speed memory 98. Accordingly, memory device 98 acts as an accumulator to temporarily take up the excess volume of visual images being transferred from vision system 49, until memory device 100 can receive the balance of the set of images.

Should a second triggering event occur before the last ones of the first set of images has been transferred to memory device 100, temporary memory device 98 receives the second set of images, and transfers such second set of images to memory device 100 after, optionally concurrently with, completing transfer of the first set of images. In some embodiments, such first and second sets of visual images are segregated from each other, as separate and distinct sets of image information, in at least one of the respective memory storage devices.

Upon completion of transfer of a given set of visual images according to a triggering event, preferably no more visual images are transferred to memory devices 98, 100 until the next triggering event occurs. While a few visual images may be routinely transferred to storage memory during routine operation of the process, for historical record-keeping purposes, e.g. to keep an historical record of product made and/or shipped, or for e.g. routine detailed off-line evaluation, e.g. by an operator, the number of images collected in sequence for each sampling is significantly less, namely less than 10%, preferably less than 2%, as many as the number of images which are stored in accord with the occurrence of a typical triggering event.

A typical set of images includes images of about 1 to about 1000 consecutive work pieces in the processing line. A range of about 1 to about 200 work pieces is contemplated for typical use in the invention. Storing fewer than the low number of work pieces mentioned misses the evidence of the triggering event. Storing greater than the high number of work pieces mentioned will inordinately increase storage costs, albeit computer memory, and may create a database so large that finding useful information may be difficult, or at least inefficient. Larger sets of work piece images can, of course, be stored if the requirements on resources are justified by the particular situation.

The illustrated embodiments indicate use of one or two cameras 38, 40. Typically, use of one camera is adequate to indicate the strengths or weaknesses of the manufacturing operation. However, where an anomaly exists, or is difficult to correct, or where e.g. more information is desired for any reason, additional cameras, such as camera 40, can be set up at the same or corresponding additional locations along the manufacturing line, and connected into the imaging system 48, and the memory system (device 98 and device 100), in order to collect and permanently store additional information. Accordingly, the imaging system can produce and store in memory a second set of data, either before, e.g. shortly before, during, or after, e.g. shortly after, collecting and storing a first set of data. The second set of data can be obtained from the same camera, e.g. directed at the same location on the processing line, as the first set of data, or can be obtained from a second camera pointed at the same location on the processing line or located at a different work station, recording a different step in the process.

By associating suitable identification indicia with each transfer of a set of visual images to storage, the reviewing artisan can search first for the identification indicia, and having found the identification indicia, can then focus on the parameters of interest associated with the respective visual images.

Where it is desired to correlate specific physical samples to the visual images of such samples, an article-specific code, different for each work piece so coded, can be printed on the respective work pieces 25, as at, for example, ear 44. Such code can be marked, for example printed, by e.g. a non-contact, e.g. ink-jet, printer 104 located up-stream of the respective camera such that the code appears both on the physical product and on the visual image of that unit of product. In the alternative, the specific unit of product can be segregated and the operator can manually mark the unit with the code. As a further alternative, a common code, specific to the triggering event, can be printed on each work piece associated with the triggering event.

While not critical to the invention, it is preferred that the visual images sent to memory devices 98, 100 be the same images sent to display device 52. In such instance, the images available for review later are the same images available for operator viewing in real time.

The invention has been described above generally in terms of known or planned triggering events. However, imaging system 48 can be programmed to trigger storage of visual images in memory upon the occurrence of a wide variety of unplanned events, for example, any occurrence of any out-of-specification event, or any other unplanned event, as well as routine sampling.

In some embodiments, the trigger signals collect visual images of fewer than all of the work pieces being processed in the manufacturing operation. Where desired, the imaging system can be programmed to collect images of every second work piece, every third work piece, or any other desired fraction of the work pieces. Such selection can collect images at regular intervals, or at selected intermittent intervals. For example, the imaging system might be programmed to command taking images of a certain set/number of sequential work pieces, for example 3 work pieces, then skip the next set of work pieces, for example 5 work pieces. The actual interval between work pieces whose images are recorded, and the pattern of which work piece images are to be collected, is a matter of selection for the artisan setting up the image collection.

As used herein, "absorbent article" refers to a class of products worn on the human body, and used generally for promotion of human hygiene by the absorption of body fluids and other exudates. Examples of such absorbent articles include, without limitation, diapers, training pants, incontinence pads, feminine hygiene pads, interlabial pads, and the like.

As used herein, a "high speed" memory storage device is a storage device capable of receiving at least about 50, preferably at least about 200, and more preferably at least about 300, still more preferably at least 400 or 500, up to at least about 1200, visual images per minute from cameras of the nature described herein for use in the invention, and must be able to track the unit rate of production of products of interest to the imaging system. Commonly available such memory devices are variously known as Random Access Memory devices, and/or Buffer Memory devices, both terms being well known in the art. Typically available such memory storage devices retain the data only so long as power is maintained on such devices, and wherein any data stored therein is lost when electrical power is terminated. Accordingly, such memory devices are not suitable for permanent storage of data. Rather, in the invention the data is written from the high speed temporary storage device to a lower speed, permanent memory storage device.

The number of images collected per minute is controlled by signals, from the processing line, indicating the frequency of passage along the processing line, of work pieces whose images are to be collected.

As used herein, a "lower speed" memory storage device is any memory storage device which is unable to receive visual images of absorbent article-type products from frame buffer 51 of the nature described herein for use in the invention, usually at a rate of less than about 500 visual images per minute. Typical such memory devices are hard drives such as are commonly employed in personal computers. Such hard drives are available in a variety of sizes, and in a range of input speeds, wherein large amounts of image data can be readily stored in permanent memory, at reasonable cost per image, albeit at lower input rates.

The number of images which can be transferred over a given unit of time is a function of the complexity of the image inspections, and the resolution of the images. The more complex the image inspection and/or the higher the image resolution, the slower the transfer rate capacity of the vision system 49.

As used herein, reference to a "generally fixed" location where visual images are collected means that the image collection element such as a camera is fixedly mounted to a physical support, and is directed to a specific step or steps at a specific work station in the manufacturing operation. Thus, "generally fixed" refers to a camera fixed in location but with capability to digitally or optically zoom the image to facilitate inspection of certain elements of the workpiece or workpieces, while not moving the camera from its mounted location. The cameras can, of course, be moved and subsequently recalibrated.

Preferably, the camera is fixed in both location and direction of aim, such that sequentially collected images represent common location and common direction of aim, of the camera.

As used herein, "pattern of images" refers to an ongoing selection of images according to a selection pattern. The selection pattern can select, and therefore collect, an image specific to each work piece, product, or process condition. The selection pattern can, in the alternative, select and collect an image according to an alternative pattern, for example collecting an image of every second or every third work piece, product, or process condition, or collecting an image of every work piece, product, or process condition for a limited number of images, at regularly-spaced, or otherwise determined, intervals. The above-described patterns are exemplary only, and not limiting, as other patterns are now obvious and viable in the invention.

Figure 4:
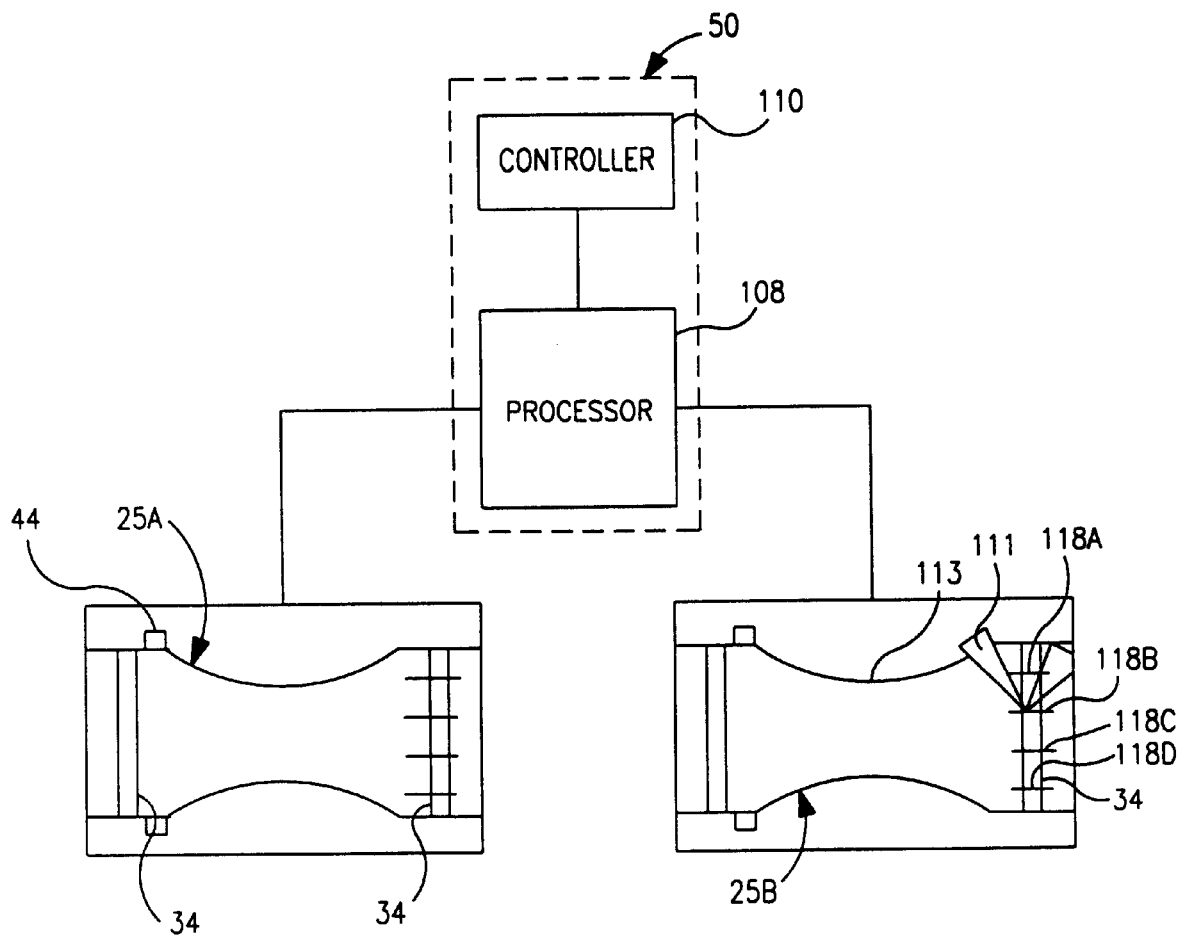
FIG. 4 is a representative top view and block diagram of a pair of images captured by an inspection and control system of the invention, and illustrating use of multiple automated data measurements in a vision image system.

Referring now to FIG. 4, image analyzer 50 includes processor 108 and controller 110. Processor 108 analyzes respective images according to software instructions received from controller 110. Such software instructions are typically inputted into controller 110 by an operator of imaging system 48. Imaging system 48, video display 52, and process control 54 are all elements of the overall process inspection and control system indicated as 112.

The images recorded by vision system 49 are recorded as pixel images. Thus, the combination of the activities of the respective pixels makes up the respective image. Accordingly, any useful digitized data is useful only to the extent the data can be translated from pixel form to another form which is subject to interpretation by one of the five human senses. And knowledge of the activity of pixels which represent information of interest conveys knowledge pertaining to the condition of the product represented by the image. One of the functions of processor 108 is to interrogate respective digitized images regarding the activities of respective pixels, whether recognized or not recognized, or groups of pixels in an image.

Typically, each pixel has a rather wide range of signal magnitudes, for example 256 possible magnitudes. Accordingly, a pixel not recording the element of interest may nevertheless record a lower level noise signal. Thus, the control system is programmed to recognize only those pixels having a signal intensity above a specified minimum. The specified minimum thus serves as an electronic filter to filter out most noise signals. The threshold magnitude, of course, has a bearing on the ability of the controller to discriminate between noise and actual detect signals, whereby historical data is typically used as a basis for arriving at the most advantageous threshold detect level of pixel activity.

While storage or analysis of an entire fully digitized visual image requires substantial commitment of analysis and storage resources, storage and/or analysis of only certain areas of the image require much less commitment of computing and/or storage capacity. Thus, one can analyze only those areas of the image that are known for higher than average risk of failure, and can store only the results of such analyses. Thus, energies directed toward improving process control can be focused on those elements of the product or process which offer the greatest opportunity for improvement. Since the greatest opportunities are associated with a relatively low fraction of the area of an absorbent article product, one can analyze all higher opportunity areas, of every unit of product, store the results, and limit the commitment of the computing and storage capacity resources to something far less than that which would be required for analysis and/or storage of a full digitized image of every unit of product.

For example, one can elect to detect the presence, and measure the location, of a waist band 34 of a disposable diaper work piece 25. The process of detecting the presence, and measuring the location, of the waist band, or any other element, comprises analyzing the digital image at locations where the respective element/waist band is expected to be found. That analysis comprises analyzing a group of pixels at the respective location, determining for each pixel whether it is recognized or not recognized, and thereby determining presence and location of the waist band. Image analyzer 50 includes the capability of making such analyses whereby the condition of the unit of product can be automatically ascertained by reviewing the test results collected and compiled by image analyzer 50.

Conventional practice is to automatically analyze one group of pixels for each element of the e.g. diaper product that is to be detected and/or located. Thus, according to conventional practice, processor 108 can analyze a first group of pixels to determine presence and location of the waist band, a second group of pixels to determine presence and location of an ear 44, a third group of pixels to determine presence and location of absorbent core 24, and the like.

The inventors herein have discovered that the difficulty with such analyses is that the automatic determination may be in error, or may be subject to doubt. In such case, an investigator has no recourse to resolving the doubt, or to determine the error, unless the image has been saved. However, as discussed hereinabove, it is impractical to save and store full digital images of all units of product. Rather, only select groups of images, if any, are stored in full digital image format. Accordingly, conventional analytical methods provide no mechanism for the investigator to resolve matters of error or of doubt as to the true condition of the product.

Where only one reading is taken of, for example, a group of linear arranged pixels along a line where the element is expected to be present, the reading is only good to the extent the area analyzed is an accurate representation of the entirety of the presence, if any, of the element on the product. And where only one reading is taken of only one part of the element, there is a risk that the area read may not be representative of the entirety of the element being assessed, in which case an erroneous conclusion will be reached.

For example, in FIG. 4, in diaper 25B, portions 111 of waist band 34 are folded adjacent right edge 113 of the diaper, while being properly fully laid out flat toward left edge 114 of the diaper. Accordingly, a single reading of the waist band as a band of pixels extending in the machine direction where the waist band should be located can well give an erroneous reading depending on where on the width of the diaper the reading is taken. If the reading is taken adjacent right edge 113, the problem will be detected. However, if the reading is taken anywhere to the left of the defective area of the waist band, the problem will not be detected.

Thus, if the analysis is done at pixel group 118A adjacent the right side of the diaper, the problem is properly detected. If the analysis is done at pixel group 118B, farther left of the right side, the problem may or may not be detected. If the analysis is done at either pixel group 118C or 11D, the analysis will not detect the problem, and the product may be released as acceptable because the existing defect was not detected.

To overcome this defect of conventional operation, the invention conducts duplicative analyses of one or more pixel groups of interest at spaced locations on the unit of product, in order to detect and correct for defective analyses. Thus, in FIG. 4, processes of the invention analyze at least two pixel groups in fulfilling any given data request. For example, pixel analyses can be taken at any two or more of pixel groups 118A, 118B, 118C, 118D, or more. Where at least two pixel groups are analyzed with respect to any one data request, the invention provides improved prospects for detecting actual anomalies in the product. The greater the number of pixel groups analyzed for a given data point request, the greater the prospect that increasingly sophisticated analytical tools can detect anomalous pixel groups, and thereby provide a truly accurate data report.

Referring again to FIG. 4, where all 4 pixel groups 118A, 118B, 118C, 118D are queried/analyzed by image analyzer 50, the analysis of at least pixel group 118A will yield the anomalous data, whereby the defect will be accurately detected. Once the defect has been detected, the operator can be alerted to do a manual inspection, to confirm whether the product is in fact defective, and then to trouble-shoot the product and/or the inspection system, to discover the cause of the defect signal.

By contrast, if only one pixel group is used, and only one resultant measurement is made at a location where a defective unit of product looks acceptable, the inspection and control system would automatically conclude that the product was acceptable, and in error release the product for shipping.

Thus, upon detecting an anomalous data condition, system 112 issues a signal directing manual inspection of the associated units of product, to determine whether respective element is in fact present, and in the proper position. If desired, inspection and control system 112 can also segregate the associated product until such time as the operator makes the determination whether the product is in fact acceptable or defective.

Given duplicative results from replicate pixel groups, where the results from the respective pixel groups agree with each other, the operator can have a high degree of confidence that the analysis is an accurate reflection of the actual condition of the unit of product, and can confidently take action on that basis. While the operator could choose to manually inspect the respective units of product, such manual inspection would have a relatively lower priority because of confidence in the duplicative analytical results.

The illustrated imaging system 48 can, on an ongoing and continuous basis, be simultaneously assessing, processing, and responding to, a variety of such parameters or conditions of the goods being fabricated. Namely, image analyzer 50 can receive image signals for any ongoing number of units of goods being manufactured by production apparatus 18.

In the invention, as analyzer 50 receives the several images, pixel groups of the images are analyzed for conformity with the parameters expected. When a pixel group indicates the unit of product is out of specification, the system then looks for a confirming pixel group from one or more replicate measurements measuring the same parameter of the same unit of goods at a spaced location. If the measurement is confirmed, the unit of goods is generally automatically culled. For example, waist band 34 is folded over on the right side of work piece 25B to about mid-way along the width of the work piece. If only a single analysis were taken at e.g. pixel group 118D, an inappropriate "accept" signal would be sent to process control 54. If only analysis 118A were used, there would be no detection at all of waist band 114. By using four analyses 118a–118D, the actual condition of waist band 114 is better recorded.

Depending on the number of units so culled automatically, the operator may or may not be alerted to the cull action. Namely, if a cull is an isolated incident, the operator generally need not be alerted. However, if a number of units are being culled, or if a high fraction of the goods are being culled, then the operator is alerted. The actual threshold condition according to which the operator is alerted, is a matter of choice, and is programmed into one or more of image analyzer 50 or process control 54.

Where three or more analyses are performed to determine a single parameter, and where one or more anomalous reading is received from one analysis, analytical methods can be used to logically determine which readings have the highest probabilities of representing the actual condition of the unit of goods, and can in some circumstances be used to determine the source of the anomalous reading or readings.

Controller 110 and/or processor 108 and/or process control 54 include programmable devices, such as personal computers. One or more of controller 110 and/or processor 108 and/or process control 54 is programmed with instructions for the handling of anomalous signals according to the types of anomalies. For example, where the anomalous analysis is only a little different from the readings of the remaining analyses, the respective analysis may represent an out-of-calibration condition, and the respective computer can automatically recalibrate the respective analysis tool.

Further, where one analysis indicates a total absence of the respective element, and the remaining analyses provide strong signals indicating presence of the element, and in light of other facts in the situation, the computer may be instructed to conclude that the anomalous reading is in fact an error, and can statistically compile and use the analyses on the basis of one less analysis, while alerting the operator to investigate the situation and, optionally, saving the respective images to permanent memory for further analysis.

In some instances, the particular element of interest can be difficult for the imaging system, and thus the analyses, to detect, whereby the analytical tools may need frequent calibration in order to be properly sensitized for reading the respective element. Where a particular analysis repeatedly transmits no detect signal, or a weak detect signal, the system can automatically recalibrate the analytical tool to enhance the ability to detect the element of interest.

For example, in some instances, after the top web, whether body side liner or baffle, has been placed over the absorbert core, the absorbent core may be difficult to detect, depending on the sensitivity of the imaging system being used to detect the absorbent core. In such case, calibration of the camera and/or the imaging system may be critical to proper detection of the absorbent core. In cases where such imaging system or camera requires frequent calibration, the computer can be programmed to recognize such out-of-calibration condition, and to automatically recalibrate the apparatus, or otherwise recalibrate while maintaining normal operation of inspections, such that what was the anomalous analysis provides the same signal response to equivalent input as the remaining analyses. Such situations of automatic calibration, of course, require periodic manual confirmation that the automatic calibrations are in fact causing the analyses to detect actual conditions of the goods on the manufacturing line.

In keeping with the illustrated embodiments, typically the replicate analyses take the replications from a common fully digitized analyzer 50, of a unit of product at a single work station on the manufacturing line, preferably at evenly-spaced locations along the respective dimension of the element, such that the replication sites can best as possible represent the actual condition of the element, whereby reliability of the conclusions of automatic inspection and control system 112, can be enhanced.

On the other hand, where sufficiently precise registration is available, a * replicate reading of an individual parameter can be taken at a subsequent work station downstream of the work station where the first reading was taken. However, concerns about precision of registration generally suggest against taking replication readings in separate work stations. In general, the closer in time and the more evenly spaced in location are the readings of a given parameter on a given unit of goods, the more reliable the replicate readings.

Where two or more parameters are being evaluated by the inspection and control system, the respective computer or computers can use different analytical methods, statistical methods, non-statistical methods, or a combination of statistical and nonstatistical methods, to analyze and evaluate the different signals received from the respective analyses measuring the respective different parameters. In some instances, the analytical method of choice is to average the analyses. In other instances, the analytical method of choice is to determine the number of readings of common or nearly common magnitude, and to use only those readings for the remainder of the analysis of that unit of goods. In yet other instances, the analytical method of choice is to compute a standard deviation, and proceed on the basis of whether the standard of deviation indicates defective product.

In some instances, the analytical method includes comparing the reading combination (the signals from the several readings) to a database of known and/or expected reading combinations, optionally including a historical probability of the occurrence of respective ones of the combinations, and based on the comparison, developing a conclusion as to the probable cause of any anomalous condition in the analyses, and developing a corresponding response to the analysis combination.

Whatever the conclusion of the inspection and control system to an anomalous signal, the conclusion is typically generated by or ultimately transmitted to controller 54; and appropriate responses are transmitted from controller 54 as control commands to the processing machinery, such as to drive units, feed units, steering units, placement units, take-off units, and the like.

In the alternative, both here and in all the above analytical methods, both fuzzy logic and/or other alternative decision theories can be used in arriving at conclusions as to probable cause of an anomaly in the signal combination and developing a corresponding response, and can be used in combination with each other as well as with more conventional statistical analytical methods.

As with any manufacturing operation, the higher the fraction of the goods which are actually inspected, the greater the reliability of the results of such inspections. Similarly, the greater the number of parameters inspected, the greater the reliability of the results of such inspections. Further, the greater the number of readings or analyses for a given parameter, the greater the probability that the analyses can be relied on to reach accurate conclusions as to the conditions of the parameters being measured.

Accordingly, the invention contemplates taking a number of readings, preferably at least three readings, for each parameter to be measured for each unit of goods being fabricated, and taking such readings for a number of parameters typical of the number of parameters read for manufacture of such goods. There is, of course, a practical limit to the number of parameters which can be read, and to the number of readings, and the amount of computing capacity and computer memory, that can be applied to collecting the data, analyzing the data and developing conclusions therefrom, and storing the data and conclusions so collected and developed. Accordingly, judicious decisions must be made with respect to how much information will actually be collected, analyzed, and stored for later manual review and evaluation.

A primary advantage of the invention is that inappropriate determination signals from a single analysis do not cause the inspection and control system to improperly accept or reject defective product or disable the system from control functions. On the contrary, based on the replicate determination signals, in some instances, the control system can automatically correct such analytical tool. In other instances, the control system can determine that the error signal is in fact an analytical tool error. In other instances, the control system can alert the operator to a high risk group of products and suggest manual inspection, and save respective images to permanent memory for later evaluation. Overall, the invention provides a control system which more accurately determines the actual condition of the goods, and better identifies sets or batches of goods for manual verification and/or inspection, which batches represent relatively higher risk of containing relatively higher fractions of defective goods.

As used herein, "programmable device" includes, but is not limited to, a user 152 programmable computer, a computer that accepts interchangeable programmed chips or other inputs into a computing or control system, interchangeable programmed computer processors, or interchangeable computer processing boards.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A method of measuring a parameter of goods being fabricated in a manufacturing operation, the method comprising:
   (a) establishing a target parameter to be measured on respective units of the goods, and acceptable conditions of the target parameter;
   (b) capturing a full digitized visual image of a unit of the goods being fabricated, the digitized visual image representing pixels and pixel combinations in the visual image;
   (c) in the captured full digitized visual image, analyzing the digital pixel combination representations in at least first and second areas of the image, which respective areas of the image are specified to indicate, collectively and in combination, a common acceptable condition of the target parameter, and thereby generating respective first and second replicate determination signals representative of the target parameter;
   (d) analyzing the determination signals in combination, for conformity of the established target parameter to the established acceptable conditions utilizing respective analysis methods; and
   (e) processing the determination signals such that if a given one of the determination signals is concluded to be inappropriate, modifying the signal combination to thereby compensate for the inappropriate signal.

2. A method as in claim 1, including analyzing pixel combination representations in at least first and second areas of the image and thereby generating respective first and second combination determination signals, for at least first and second parameters.

3. A method as in claim 1, including processing the determination signals so as to use first and second different analytical methods to analyze the determination signals representative of the respective first and second parameters.

4. A method as in claim 1, including analyzing the pixel combination representations with respective at least first, second, and third separate and distinct replications of determinations of the condition of the target parameter in respective at least first, second, and third areas of the image.

5. A method as in claim 4, processing of the determination signals comprising computing an average of the signals.

6. A method as in claim 4, processing of the determination signals comprising computing a standard deviation based on the determination signals.

7. A method as in claim 4 wherein, when analysis detects inappropriate input from one of the selected areas of the image, automatically adjusting the analysis to a basis of analyzing one less area.

8. A method as in claim 1, including analyzing the pixel combination representations in respective at least first, second, and third areas of the image for at least first and second parameters at respective replication sites on the goods.

9. A method as in claim 8, including processing the determination signals from the respective first and second parameters so as to use first and second different analytical methods to analyze the determination signals representative of the respective first and second parameters.

10. A method as in claim 1, processing of the determination signals comprising determining the number of signals of common or nearly common signal characteristics.

11. A method as in claim 1, including comparing the signal combination to a database of known and/or expected signal combinations, and based on the comparison, developing a conclusion as to the probable cause of any anomaly in the signal combination, and developing a corresponding response to the signal combination.

12. A method as in claim 11, including transmitting the response as a control signal to a process controller controlling the manufacturing operation.

13. A method as in claim 1, including comparing the signal combination to a database of known and/or expected signal combinations, including a historical probability of the occurrence of respective ones of the combinations, and based on the comparison, developing a conclusion as to the probable cause of any anomaly in the signal combination, and developing a corresponding response to the signal combination.

14. A method as in claim 1, the multiple analyses of the pixel combination representations comprising respective multiple determinations using software interpretation of selected areas of the full digitized visual image.

15. A method as in claim 1, the method further comprising so analyzing each of the goods being fabricated in the manufacturing operation.

16. A method of measuring the location of an element on an absorbent article being fabricated in a manufacturing operation, the method comprising:
   (a) establishing an acceptable location for the element on the absorbent article;

(b) capturing a full digitized visual image of the absorbent article, the full digitized visual image representing pixels and pixel combinations in the visual image;

(c) in the captured full digitized visual image, analyzing the digital pixel combination representations in at least first and second areas of the image, which respective areas of the image are specified to indicate, collectively and in combination, a common acceptable location of the element, and thereby generating respective first and second replicate determination signals representative of the location of the element on the product;

(d) analyzing the determination signals in combination, for conformity of the location of the element to the established acceptable locations utilizing respective analysis methods; and (e) processing the determination signals such that if a given one of the determination signals is concluded to be inappropriate, modifying the signal combination to thereby compensate for the inappropriate signal.

17. A method as in claim 16, including analyzing pixel combination representations in at least first and second areas of the image and thereby generating respective first and second combination determination signals, for at least the above-recited element location, and for a second parameter.

18. A method as in claim 17, including processing the determination signals so as to use first and second different analytical methods to analyze the determination signals representative of the respective location, and the second parameter.

19. A method as in claim 16, including analyzing the pixel combination representations with respective at least first, second, and third separate and distinct replications of determinations of the location of the element in respective at least first, second, and third areas of the image.

20. A method as in claim 19, processing of the determination signals comprising computing an average of the signals.

21. A method as in claim 19 wherein, when the analysis detects inappropriate input from one of the above areas of the image, automatically adjusting the analysis to a basis of analyzing one less area.

22. A method as in claim 16, including analyzing the pixel combination representations in respective at least first, second, and third areas of the image for at least the above-recited location, and a second parameter, at respective replication sites on the goods.

23. A method as in claim 22, including processing the determination signals from the respective location, and the second parameter, so as to use first and second different analytical methods to analyze the determination signals representative of the respective location, and the second parameter.

24. A method as in claim 16, processing of the determination signals comprising determining the number of signals of common or nearly common signal characteristics.

25. A method as in claim 16, processing of the determination signals comprising computing a standard deviation based on the determination signals.

26. A method as in claim 16, including comparing the signal combination to a database of known and/or expected signal combinations, and based on the comparison, developing a conclusion as to the probable cause of any anomaly in the signal combination, and developing a corresponding response to the signal combination.

27. A method as in claim 26, including transmitting the response as a control signal to a process controller controlling the manufacturing operation.

28. A method as in claim 16, including comparing the signal combination to a database of known and/or expected signal combinations, including a historical probability of the occurrence of respective ones of the combinations in such absorbent articles, and based on the comparison, developing a conclusion as to the probable cause of any anomaly in the signal combination, and developing a corresponding response to the signal combination.

29. A method as in claim 16, the multiple analyses of the pixel combination representations comprising respective multiple determinations using software interpretation of selected areas of the full digitized visual image.

30. A method as in claim 16, the method further comprising so analyzing each of the absorbent articles fabricated in the manufacturing operation.

* * * * *

UNITED STATES PATENT AND TRADEMARK OFFICE
CERTIFICATE OF CORRECTION

PATENT NO.    : 6,266,436 B1
DATED         : July 24, 2001
INVENTOR(S)   : Thomas A. Bett, Tanakon Ungpiyakul, Shawn T. Lemery, Robert J. Giza and Wayne A. Bernhardt It is certified that error appears in the above-identified patent and that said Letters Patent is hereby corrected as shown below:

Column 1,
Line 40, insert a new paragraph before "As".

Column 10,
Line 4, insert -- 10 -- after "numeral".
Line 20, insert -- 25 -- after "pieces".

Column 11,
Line 21, combine paragraphs that start with "Referring" and "Suitable" into one paragraph.

Column 12,
Line 6, insert -- 20 -- after "web".

Column 19,
Line 54, delete "11D" and substitute -- 118D --.

Column 21,
Line 40, delete "absorbert" and substitute -- absorbent --.
Line 66, delete "*".

Column 23,
Line 22, delete "152" and substitute -- - --.

Signed and Sealed this

Twenty-ninth Day of October, 2002

*Attest:*

JAMES E. ROGAN
*Director of the United States Patent and Trademark Office*

*Attesting Officer*